Jan. 19, 1954     J. A. VICTOREEN     2,666,801
ELECTRIC BATTERY AND METHOD OF MAKING SAME
Filed July 14, 1950
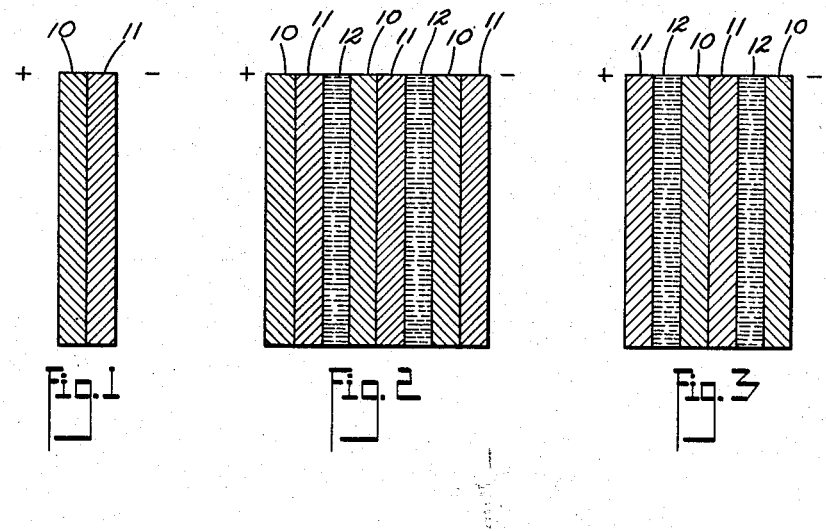
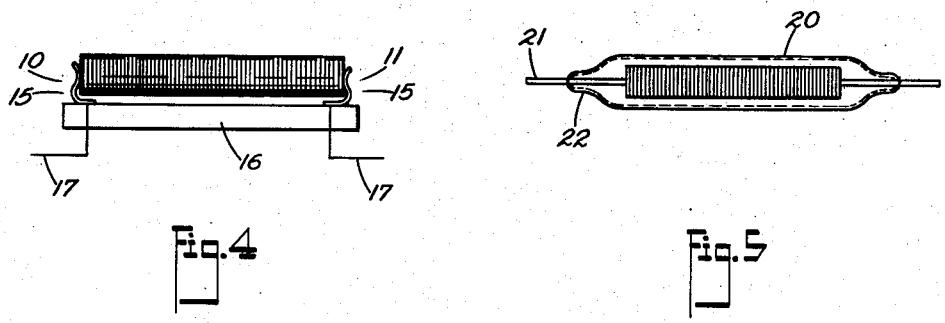
INVENTOR.
BY John A. Victoreen
by J. D. Douglas
HIS ATTORNEY Patented Jan. 19, 1954

2,666,801

UNITED STATES PATENT OFFICE 2,666,801

ELECTRIC BATTERY AND METHOD OF MAKING SAME

John A. Victoreen, Cleveland, Ohio

Application July 14, 1950, Serial No. 173,723

12 Claims. (Cl. 136—111)

This invention relates to batteries and the method of making the same. More particularly, it is concerned with a battery construction which lends itself to the manufacture of batteries of subminiature size for producing relatively high potentials.

Heretofore, batteries have been made which comprise a series of individual cells requiring large amounts of insulation and resulting in large devices. The insulation deteriorated rapidly, reducing the shelf life. Furthermore, although relatively high voltage batteries have been made and of a reduced size, they were still extremely large and bulky.

By my present invention I am able to make a battery having a high potential, which battery is extremely small. For example, a 100 volt battery can be made which could be ⅛" to ¼" in diameter and between 1" and 2" long. Since no insulation is needed with my improved construction, the shelf life is extremely long if proper storage facilities are provided. Such a device would be particularly useful in connection with portable ionization chambers where the main desideratum is a high voltage battery and where the current drain is very limited.

In the drawings:

Fig. 1 is a diagrammatic view of a single element used in the battery of my invention;

Fig. 2 is a diagrammatic view of a plurality of the elements of Fig. 1 assembled to provide a battery;

Fig. 3 is a view of a modified form;

Fig. 4 is a view of a completed battery formed according to my invention; and

Fig. 5 is a view of a modified form of my invention.

Basically, my invention comprises the provision of bi-polar elements which may be combined with solid or substantially dry electrolyte elements in stacked relation to form a single columnar battery which is self supporting.

More particularly, I provide bi-polar elements which may be formed in the shape of small discs. Each disc as shown in Fig. 1 comprises one face 10 that is of a material which is chemically electro-positive with respect to the other face 11. It will be appreciated that the discs herein referred to as bi-polar may not necessarily be of dissimilar metals but may consist of a single metal and a layer of conducting material which has an electro-chemical difference of potential.

For instance, a lead disc with one surface comprised of lead dioxide would be suitable. Other materials could be iron with a nickel oxide surface.

If it was truly bi-metallic, it could be zinc or copper coated with silver, gold or platinum.

It will be appreciated that any two dissimilar metals or combination of metals and oxides may be used provided they have an electro-chemical difference of potential and are suitable for battery construction, as is well known to those versed in the art.

As can best be seen from Fig. 2, a plurality of the elements of Fig. 1 are placed in stacked relation, the elements being separated from each other by electrolyte discs 12. Preferably, the electrolyte discs may be of a semi-dry nature wherein the moisture content is relatively low.

It will be appreciated that a battery of this type has inherently low current possibilities due to high internal resistance of the solid electrolyte. Obviously, the internal resistance will vary with the conductivity of the electrolyte, which may be made in various ways. Plasticized gelatin, which could be comprised of gelatin with a plasticizer, such as glycerine, and with addition of a suitable electrolyte such as ammonium chloride, potassium hydroxide or sulphuric acid. Another type of disc could be made of paper impregnated with thermo or thermosetting plastic and an electrolyte. It is preferred that the material be such that it will provide the composite formation of acting as a binder for holding the elements together as well as providing the desired electrolyte.

The bi-polar and electrolytic discs being stacked together are subjected to heat and pressure, the pressure being applied endwise of the stack to cause the laminations to be pressed securely together and the heat applied, causing the electrolyte discs to become intimately and firmly cemented to the metallic discs cementing them to each other to provide a unitary battery.

The unit so formed then has the peripheral edges of the discs ground, such as in a centerless grinder, to expose the discrete laminations and remove any materials that may have migrated over from one element to another, thus providing shorts which, for obvious reasons, would be undesirable.

Normally, the end discs 10 and 11 would be the terminals and the battery secured in place in a circuit by inserting it between clips 15 in a suitable holder 16, leads 17 being provided to the clips in a well known manner.

It will be appreciated from the foregoing that the battery comprises a plurality of serially connected cells. It will be particularly noted that the connection between the cells is by the means of the bi-polar plates, and that the peripheries of the elements being exposed are free and, therefore, so long as they remain clean, no leakage occurs from cell to cell.

I also contemplate making the batteries with an electrolyte that is completely dry. In such instances, to condition them for use they would be exposed to air, moist atmosphere, or even immersed in water to activate the electrolyte. The high resistance of the cell would prevent deterioration while it was in the water.

One manner of manufacture would be to use bi-polar plates of relatively large areas; for instance, 6″ or 12″ square or larger. These are stacked with alternate layers of the electrolyte material and subjected to heat and pressure to make a composite laminate which would have the desired voltage between end plates. This block could then be sawed into smaller blocks. This would allow the manufacture of batteries having higher or lower current capabilities, depending upon the cross sectional area of the ultimate battery. In the case of the exceedingly small batteries, they could be ground to a cylindrical shape in a centerless grinder. In the case of the larger type batteries, they could be ground in square formation, the main desideratum being that the edge materials, which might extend from one cell to the other, be removed to eliminate the possibility of short circuits as described.

In Fig. 5, I have shown another modification of my invention, wherein the battery of Fig. 4 is enclosed in a glass tube 20, leads 21 are provided which extend through the sealed tubulation 22 which are sealed to the leads to make the entire battery enclosed in an air tight envelope. If desired, the tube could also be filled with an inert gas, such as argon or neon. Nitrogen or hydrogen could also be used for the filling gas.

Under certain conditions, it may be desirable after grinding to coat the outer edge surface of the laminate column with a suitable insulating material, such as silicone varnish.

It is contemplated that the bi-polar discs may be relatively thin and separated by a very thin layer of electrolyte, the discs being of the order of a few thousandths of an inch in thickness.

The bi-polar discs could also be secured together to provide a battery by using a cold setting cement and only sufficient pressure to hold them together while the cement was setting. Such a cement could be composed of a suitable glue, shellac, or one of the cements which may include chlorinated rubber, sodium silicate, or many of the other commonly known materials.

Having thus described my invention, I am aware that numerous and extensive departures may be made therefrom without departing from the spirit or scope of my invention.

I claim:

1. A battery of cells composed of a plurality of bi-polar discs between which are alternately disposed discs of semi-conducting electrolyte discs, the peripheries of the discs being cleaned to expose the body of the material, and the discs all being cemented together to provide a self supporting unit.

2. The method of making a battery composed solely of a series of cells comprising bi-polar elements having electrolyte between them which comprises stacking and cementing said elements and electrolyte in columnar relation to provide a self sustaining column.

3. The method of making a battery composed of a series of cells comprising bi-polar elements having electrolyte between them which comprises stacking and cementing said elements and electrolyte in columnar relation to provide a self sustaining column, and then grinding the periphery of said battery to expose the discrete surfaces in uncontaminated laminar relation.

4. The method of making a battery composed of a series of cells, each comprising a disc bi-polar element and having a disc electrolyte therebetween which comprises assembling the bi-polar discs and electrolyte discs together in columnar relation, and applying heat and pressure to the battery to provide a solid self supporting laminated column and then grinding the periphery of the column to remove foreign material and expose the raw edges of said discs.

5. A battery of cells composed of a series of bi-polar discs between each of which a disc of semi-conducting electrolyte is disposed, said discs all being cemented to each other to provide a self supporting column and the surface of the resulting column removed to provide a clear uncontaminated surface for each of the edges of said discs.

6. The structure of claim 5 wherein that structure is disposed in a sealed non-conducting envelope having connecting leads extending from the ends of the column exteriorly of the envelope.

7. The structure of claim 5 where the exterior of the battery is coated with silicone varnish.

8. A battery composed of a plurality of bi-polar elements and a plurality of electrolyte elements, the said elements having substantially flat faces, said bi-polar elements and electrolyte elements being alternately disposed with the flat faces thereof in abutting relationship, said electrolyte elements including binding means which under heat and pressure bind the said abutting elements permanently together and form a self-supporting unitary columnar unit.

9. The invention as defined in and by claim 8 wherein said electrolyte is substantially dry and the surface of the columnar structure is treated to provide a clear uncontaminated surface for each of the edges of said elements.

10. The invention as defined in and by claim 8 wherein said columnar structure is disposed in a non-conducting envelope, said envelope having connecting leads extending from the ends of the column exteriorly of the envelope.

11. The invention as defined in and by claim 8 wherein said electrolyte is of substantially dry type and the exterior surface of the column is provided with a coating of a silicone varnish.

12. A battery of cells composed of a series of bi-polar discs between each of which a disc of semi-conducting electrolyte is disposed, said discs all being cemented to each other to provide a self supporting column and the surface of the resulting column removed to provide a clear uncontaminated surface for each of the edges of said discs, said column disposed in a non-conducting glass envelope.

JOHN A. VICTOREEN.

References Cited in the file of this patent

UNITED STATES PATENTS

| Number | Name | Date |
|---|---|---|
| 1,401,671 | Chubb | Dec. 27, 1921 |
| 2,154,312 | MacCallum | Apr. 11, 1939 |
| 2,187,638 | Zernike | Jan. 16, 1940 |
| 2,375,875 | Sanderson | May 15, 1945 |
| 2,416,576 | Franz et al. | Feb. 25, 1947 |
| 2,463,565 | Ruben | Mar. 8, 1949 |
| 2,487,985 | Ruben | Nov. 15, 1949 |
| 2,536,697 | Ruben | Jan. 2, 1951 |
| 2,632,781 | Woodring | Mar. 24, 1953 |

FOREIGN PATENTS

| Number | Country | Date |
|---|---|---|
| 700,818 | France | Mar. 7, 1931 |
| 771,012 | France | Sept. 28, 1934 |